(12) United States Patent
Wolff (10) Patent No.: US 7,759,276 B2
(45) Date of Patent: Jul. 20, 2010

(54) ADSORPTIVE FORMED BODY HAVING AN INORGANIC AMORPHOUS SUPPORTING STRUCTURE, AND PROCESS FOR THE PRODUCTION THEREOF

(75) Inventor: Thomas Wolff, Munchberg (DE)

(73) Assignee: helsa-Automotive GmbH & Co. KG (DE)

(*) Notice: Subject to any disclaimer, the term of this patent is extended or adjusted under 35 U.S.C. 154(b) by 1066 days.

(21) Appl. No.: 11/186,524

(22) Filed: Jul. 21, 2005

(65) Prior Publication Data

US 2006/0063663 A1 Mar. 23, 2006

Related U.S. Application Data

(60) Provisional application No. 60/602,457, filed on Aug. 18, 2004.

(30) Foreign Application Priority Data

| Jul. 23, 2004 | (DE) | ........................ 10 2004 035 949 |
| Aug. 20, 2004 | (DE) | ........................ 10 2004 040 439 |
| Jul. 8, 2005 | (DE) | ........................ 10 2005 032 345 |

(51) Int. Cl.
| B01D 39/06 | (2006.01) |
| B01D 39/20 | (2006.01) |
| B01D 59/26 | (2006.01) |
| B01J 21/18 | (2006.01) |
| B32B 3/12 | (2006.01) |
| C03C 1/00 | (2006.01) |
| C03C 14/00 | (2006.01) |
| C03C 12/00 | (2006.01) |
| C04B 35/52 | (2006.01) |
| C01B 31/08 | (2006.01) |

(52) U.S. Cl. ...................... 502/185; 502/180; 502/416; 55/523; 96/108; 501/32; 501/99; 501/100; 428/116; 428/118

(58) Field of Classification Search ................. 502/180, 502/416, 527.2, 527.21; 501/32, 99, 100; 428/116, 118; 96/108; 55/523
See application file for complete search history.

(56) References Cited

U.S. PATENT DOCUMENTS

| 3,235,089 A | 2/1966 | Bourroughs et al. |
| 4,481,179 A | 11/1984 | Wei |

(Continued)

FOREIGN PATENT DOCUMENTS

DE 3719606 12/1988

(Continued)

OTHER PUBLICATIONS

Brunauer et al., "Adsorption of gases in multimolecular layers", J. Am. Chem. Soc., 1938, 309, vol. 60.

(Continued)

*Primary Examiner*—Patricia L Hailey
(74) *Attorney, Agent, or Firm*—Fulbright & Jaworski, LLP (57) ABSTRACT

The invention relates to a formed body comprising an at least partially amorphous inorganic supporting structure and an adsorption agent, which adsorption agent is disposed on and/or in the amorphous inorganic supporting structure. The invention further relates to a process for the production of same and to the use of said formed body in a filtering system, preferably in a motor vehicle.

22 Claims, 7 Drawing Sheets

U.S. PATENT DOCUMENTS

| | | | |
|---|---|---|---|
| 4,514,346 A | 4/1985 | Luhleich et al. | |
| 4,518,704 A | 5/1985 | Okabayashi et al. | |
| 4,564,496 A | 1/1986 | Gupta et al. | |
| 4,772,508 A | 9/1988 | Brassell | |
| 4,777,152 A | 10/1988 | Tsukada et al. | |
| 4,923,843 A | 5/1990 | Saforo et al. | |
| 5,166,123 A * | 11/1992 | Agui et al. | 502/426 |
| 5,213,895 A | 5/1993 | Hirai et al. | |
| 5,225,081 A | 7/1993 | Brownawell | |
| 5,324,692 A | 6/1994 | Benker et al. | |
| 5,389,325 A | 2/1995 | Bookbinder et al. | |
| 5,429,782 A | 7/1995 | Masutani et al. | |
| 5,451,554 A | 9/1995 | Guile et al. | |
| 5,474,587 A | 12/1995 | Dias et al. | |
| 5,488,021 A | 1/1996 | DeLiso et al. | |
| 5,538,681 A | 7/1996 | Wu | |
| 5,543,096 A | 8/1996 | Wu | |
| 5,707,922 A * | 1/1998 | Mimori et al. | 502/416 |
| 5,750,026 A * | 5/1998 | Gadkaree et al. | 210/502.1 |
| 5,759,460 A | 6/1998 | Niihara et al. | |
| 5,914,294 A | 6/1999 | Park et al. | |
| 6,017,473 A | 1/2000 | Maier et al. | |
| 6,582,796 B1 | 6/2003 | Joulin et al. | |
| 6,652,629 B2 * | 11/2003 | Wolff et al. | 96/131 |
| 6,699,561 B2 * | 3/2004 | Wolff | 428/116 |
| 7,017,757 B2 * | 3/2006 | Wolff et al. | 210/483 |
| 2002/0011439 A1 | 1/2002 | Blum et al. | |
| 2002/0011683 A1 | 1/2002 | Gadkaree et al. | |
| 2002/0103081 A1 | 8/2002 | Wolff | |
| 2002/0142146 A1 | 10/2002 | Gadow et al. | |
| 2003/0012938 A1 | 1/2003 | Bauer et al. | |
| 2003/0168757 A1 | 9/2003 | Bauer et al. | |
| 2003/0178357 A1 | 9/2003 | Wolff et al. | |
| 2003/0180538 A1 | 9/2003 | Gray | |
| 2004/0131512 A1 * | 7/2004 | Abe et al. | 422/180 |
| 2005/0084717 A1 | 4/2005 | Tani et al. | |

FOREIGN PATENT DOCUMENTS

| | | |
|---|---|---|
| DE | 4025239 | 12/1991 |
| DE | 43 39 667 A1 | 5/1995 |
| DE | 4413127 | 10/1995 |
| DE | 19727115 | 1/1998 |
| DE | 19711831 | 9/1998 |
| DE | 695 12 339 T2 | 5/2000 |
| DE | 69512339 | 5/2000 |
| DE | 69429323 | 7/2002 |
| DE | 101 04 882 A1 | 8/2002 |
| DE | 10104882 | 8/2002 |
| DE | 102 13 016 A1 | 10/2003 |
| DE | 10213016 | 10/2003 |
| EP | 0 570 847 | 11/1993 |
| EP | 0657403 | 6/1995 |
| EP | 0796830 | 9/1997 |
| EP | 0 570 847 B1 | 12/1998 |
| EP | 1338322 | 8/2003 |
| EP | 1514588 | 3/2005 |
| EP | 1541817 | 6/2005 |
| EP | 1544184 | 6/2005 |
| EP | 1666146 | 6/2006 |
| JP | 57122924 | 7/1982 |
| JP | 2005-350319 | * 12/2005 |
| WO | WO-9313303 | 7/1993 |
| WO | WO-9528279 | 10/1995 |
| WO | WO-0001463 | 1/2000 |
| WO | WO-01/98207 | 12/2001 |
| WO | WO-2005049524 | 6/2005 |

OTHER PUBLICATIONS

Fitzner et al., "Fiber-Reinforced Silicon Carbide", Am. Cer. Soc. Bull., 1986, 326, vol. 65.

Greil et al., Biomorphic Cellular Silicon Carbide Ceramics from Wood: I. Processing and Microstructure', J. Eur. Ceram. Soc., 1998, 1961-1973, vol. 18.

Hillig, "Melt infiltration approach to ceramic matrix composites", J Am Ceram Soc, 1988, C-96-C-99, vol. 71.

Morancais et al., "High porosity SiC ceramics prepared via a process involving an SHS stage", J. Eur. Ceram. Soc., 2003, 1949-1956, vol. 23(11).

Qian et al., "Preparation and properties of porous microcellular SiC ceramics by reactive infiltration of Si vapor into carbonized basswood", Materials Chemistry and Physics, Dec. 20, 2003, 648-653, vol. 82(3).

Ferro et al., "Wetting behavior in the Al-Si/SiC system: Interface reactions and solubility effects", Acta metall. Mater., 1995, 3061-3073, vol. 43(8).

International Preliminary Examination Report re International Application No. PCT/EP2006/06559, issued Jan. 22, 2008.

International Search Report issued Sep. 20, 1995 during the prosecution of International Application No. PCT/US95/07438.

Greil et al., "Effect of microstructure on the fracture behavior of biomorphous silicon carbide ceramics", Journal of the European Ceramic Society, 2002, 2697-2707, vol. 22(14-15).

* cited by examiner

ADSORPTIVE FORMED BODY HAVING AN INORGANIC AMORPHOUS SUPPORTING STRUCTURE, AND PROCESS FOR THE PRODUCTION THEREOF

CROSS-REFERENCE TO RELATED APPLICATIONS

This Application is a Non-Provisional application of Provisional Application Ser. No. 60/602,457 filed on Aug. 18, 2004.

TECHNICAL FIELD

The invention relates to an adsorptive formed body, a process for the production thereof and to the use of said formed body in a filtering system, preferably in a motor vehicle.

BACKGROUND OF THE INVENTION

Adsorptive formed bodies, particularly those having a channel structure and based on activated carbon, are employed preferably in filtering systems used for the removal of hydrocarbons from air streams. In particular, adsorptive formed bodies are being used preferentially in the automotive industry in tank ventilation systems. The channel structure can be obtained by extrusion and offers a large contact area per unit volume. Substantially improved adsorption dynamics or adsorption kinetics are achieved on account of the channel structure, as compared with granulated active carbon or extruded carbon formed bodies.

An activated carbon formed body is disclosed in U.S. Pat. No. 5,488,021. Bentonite, attapulgite, or kaolin can be used as a matrix in which the activated carbon can be embedded. Cellulose ether is added to act as green binder. Since the formed body is dried at a maximum temperature of 100° C. and is not sintered, the cellulose ether is not thermally degraded and restricts the absorption capacity of activated carbon.

The formed body with channel structure which is described in U.S. Pat. No. 5,914,294 is produced using a ceramic sintering process. This is done by mixing activated carbon in powder form with a ceramic-forming material and a flux, and sintering it under a blanket of protective gas after it has been formed and dried. The flux reduces the sintering temperature, but even so, temperatures above 1000° C. must be used in order to ensure adequate rigidity and water insolubility of the formed body.

The drying procedure of the process described in U.S. Pat. No. 5,914,294 is of paramount importance. Owing to the presence of materials in the formed body which dry at different rates, the formed body must be dried slowly, in order to avoid the formation of cracks. For this reason, while drying the formed body, its relative humidity is reduced under controlled conditions, in order to avoid stresses. The drying process is done using vacuum drying or freeze-drying and usually takes about 24 hours.

In U.S. Pat. No. 5,543,096, a silicone resin is used in addition to clay as a binding agent. The formed body is fired at a temperature between 1100° C. and 1300° C., causing amalgamation of clay and $SiO_2$ groups in the silicone resin.

U.S. Pat. No. 5,389,325 and U.S. Pat. No. 5,451,554 describe different methods. U.S. Pat. No. 5,389,325 uses phenolic resin as the binding agent and U.S. Pat. No. 5,451,554 uses epoxy resin as the binding agent. In both cases the resins are crosslinked and cured in a drying step, by means of which rigidity is achieved. However, the temperatures applied are not adequate to free the activated carbon in the formed body from the cellulose ether added and from other thermally destructible additives such that it will exhibit an optimal absorptive capacity.

DE 101 04 882 describes systems in which carbonized resin is used as the binding agent. DE 101 04 882 discloses a very stable formed body, in which the activated carbon particles are embedded in a matrix, and in which the matrix consists of two three-dimensional structures intermingled with each other, made up of carbonized phenolic resin and an inorganic framework that exhibits baked ceramics bonded with the help of a silicate binding agent.

It is an object of the present invention to provide a formed body showing good adsorption characteristics, in which the adsorption agent is securely bonded without restricting its adsorptive capacity to any substantial extent, and which is easy to produce.

BRIEF SUMMARY OF THE INVENTION

The present object is achieved with the help of a formed body containing an at least partially amorphous inorganic supporting structure and an adsorption agent, the adsorption agent being disposed on and/or in the amorphous inorganic supporting structure, which amorphous inorganic supporting structure consists of or comprises glass, the proportion of amorphous inorganic supporting structure being from 25 to 60% by weight, based on the total weight of the formed body, and the formed body has a channel structure incorporating passages.

Preferred developments of the formed body are defined in claims 2 to 19.

The objective of the invention is further achieved by the use of the formed body as defined in any one of claims 1 to 19 as a filtering system, preferably in a motor vehicle.

The formed body of the invention is preferably used in a filtering system, more preferably in a filtering system of a motor vehicle. The formed body of the invention is preferably used in a tank ventilation system and in the region of the motor air suction system of a motor vehicle.

The inventor of the present invention has discovered, surprisingly, that a formed body having good mechanical stability and good adsorption characteristics can be produced if the adsorption agent is disposed in an at least partially amorphous inorganic supporting structure and the amorphous inorganic supporting structure consists of or comprises glass, the proportion of amorphous inorganic supporting structure being from 25 to 60% by weight, based on the total weight of the formed body, and the formed body has a channel structure incorporating passages.

The formed body of the invention can also be referred to as an adsorptive formed body. By the term adsorptive formed body is meant, within the scope of the invention, that the formed body is capable of adsorption. The adsorptive formed body can be used, for example, to selectively absorb impurities, for example in the form of gases or vapors, and to release them, i.e. to desorb them, at an appropriate point of time. The so-called regeneration of the adsorptive formed body by desorption can take place, for example, by purging the formed body with air or nitrogen. Regeneration may, however, be effected thermally, if desired. Thus, the adsorptive formed body can also be provided with electrical contacts which enable controlled heating of the formed body, and, therefore, controlled regeneration thereof.

By the term "amorphous" is meant, within the scope of the invention, the substantial, and preferably complete, absence of crystalline or polycrystalline structures such as occur, for example, in ceramic materials. This means that, in general, in the inorganic supporting structure of the invention there is no long-range order typical of crystals.

By an "amorphous supporting structure" is meant, within the scope of the connection, that the supporting structure is substantially non-crystalline. The adsorption agent(s) is/are disposed in and/or on the amorphous supporting structure. Preferably, the adsorption agents are fixed in position, so that even when the formed body is subjected to mechanical stresses there is no attrition, or only an insignificant degree of attrition, of the adsorption agent. The adsorption agent(s) is/are preferably only partially bonded in the amorphous supporting structure, so that the adsorption agents are only partially covered or surrounded by the amorphous supporting structure. In other words, the adsorption agent is preferably, to a large extent, immobilized in or on the amorphous structure so as make the major portion of the surface of the adsorption agents accessible to impurities such as gases or vapors.

The inorganic amorphous supporting structure consists of or comprises glass. The inorganic amorphous supporting structure is neither brittle nor porous, and has, therefore, the elastic characteristics of an isotropic solid body. These characteristics particularly facilitate use in motor vehicles, in which the formed bodies are subjected to vibrations over long periods of time, such as many years.

The previous and following percentages by weight are always based on the total weight of the adsorptive formed body, unless otherwise stated, and always add up to 100% by weight of the total weight of the adsorptive formed body.

The content of amorphous supporting structure is from 25 to 50%, preferably from 30 to 55% by weight, and more preferably from 40 to 50% by weight, by weight, based on the total weight of the formed body. In one embodiment the content of glass is from 25 to 60%, more preferably from 30 to 55%, and most preferably from 40 to 50%, by weight, always based on the total weight of the formed body.

The adsorptive formed body of the invention comprises, in addition to the inorganic amorphous supporting structure, one or more adsorption agents and, optionally, fillers.

In the context of the invention it is understood that a supercooled melt forms the basic substance of the amorphous supporting structure. For this reason, the content of inorganic amorphous supporting structure forms, besides the content of adsorption agents, the major fraction relative to any other additives.

In one embodiment the glass has a three-dimensional, continuous glass framework structure. By a "three-dimensional, continuous glass framework structure" is meant, within the scope of the invention, a supporting glass structure containing or consisting of glass and comprising a supercooled glass melt. which forms a solid structure without further binding agents. The inventors have been successful, surprisingly, in providing an adsorbent formed body which, by reason of the three-dimensional continuous glass framework structure, possesses outstanding thermal, chemical, and mechanical resistance.

The glass preferably comprises supercooled melts of $SiO_2$ and additives, preferably selected from the group consisting of CaO, $Na_2O$, $B_2O_3$, $Al_2O_3$ $Fe_2O_3$, $Na_2O$, BaO, SrO, PbO, MgO, $P_2O_5$, and mixtures thereof.

According to a preferred embodiment, the formed body contains, as adsorption agents, activated carbon, zeolites, and mixtures thereof, which are preferably in particulate form. The different zeolites, i.e. the various sizes of their cage structures, can be implemented to selectively adjust the adsorption characteristics, so that, for example, the separation of hydrocarbon isomers will be possible.

Preferably, activated carbon is used as the adsorption agent. The content of adsorption agent, preferably activated carbon, preferably ranges from 5 to 50% by weight, more preferably from 10 to 40% by weight, and most preferably from 20 to 36% by weight, always based on the total weight of the formed body.

All types of commercially available activated carbon can be used in the formed body of the invention. Preferably, the activated carbon is in particulate form, but even activated carbon in powder form has shown itself to be suitable for the production of the adsorptive formed body. The activated carbon can be obtained from natural sources. Activated carbon obtained from charcoal, coconut carbon, olive seed carbon, mineral coal, and lignitic coke has shown itself to be particularly suitable. Alternatively, the activated carbon may be produced from synthetic materials such as, for example, polymer materials, preferably styrene/divinylbenzene copolymers, optionally sulfonated prior to pyrolysis.

The activated carbon used in the formed bodies of the invention is preferably acid activated and/or steam activated, in order to optimize the adsorption kinetics or adsorption capacity, if necessary.

It has been found, in particular, that activated carbons having an acidic surface form a particularly strong bond with the amorphous supporting structure.

It has further been found that with an acidic surface having a pH<4 the bond formed between the surface of the activated carbon and the supporting structure is too strong, so that the adsorption properties may be affected. The formation of a strong bond of the activated carbon having a surface pH<4 apparently leads to increased embedding of the activated carbon particles in the amorphous structure and/or to increased envelopment of the activated carbon particles by the amorphous structure, so that the surface available for the adsorption of impurities is diminished and/or is less accessible. The surface of the activated carbon preferably has a pH in the range of from 4 to 6.9.

The adsorptive formed body preferably contains added fillers. The content of these fillers is preferably up to 25% by weight, and more preferably in the range of from 5 to 18% by weight, always based on the total weight of the formed body. Preferably, the formed body contains at least one filler.

It has been found that the use of one or more fillers for the production of the formed body of the invention is advantageous, since they counteract any possible dissociation of the starting mixture used for the production process. When the starting mixture consists of glass powder and activated carbon particles, it has been found that the addition of fillers can substantially avoid dissociation. In this respect, the addition of fillers simplifies the production of the formed body of the invention. Moreover, the filler improves the dimensional stability when the supercooled glass melt is fused for the production of the amorphous supporting structure.

Furthermore, the filler can enhance the plasticity of the starting mixture, which is advantageous for shaping the formed body, which, for example, can be done by extrusion.

The fillers used are preferably inorganic, particularly mineral, fillers, and especially materials which bind well to molten glass.

Suitable mineral fillers include, for example, clay, aluminas, chamotte, kaolin, calcined kaolin, quartz powder, aluminum oxide, and highly plastic clay, preferably ball clay, and mixtures thereof. Ball clay is a commercially available clay with good plasticizing and shaping characteristics (sold by Kentucky-Tennessee Clay Company of Mayfield, USA). When using materials with an intrinsic moisture content, such as clay, for example, it is to be noted that during the drying process of the green body of the formed body of the invention, there is higher shrinkage than when materials are used that have no moisture content, such as, for example, chamotte. Materials with plasticizing characteristics, such as, for example, clay, increase the formability, e.g. the extrudability, of the starting mixture.

In another embodiment, the adsorptive formed body contains fibers as the filler. The addition of fibers improves the mechanical stability of the formed body of the invention in an advantageous way. The fibers can thus be alternatively referred to as stabilizing fibers.

The fibers are preferably inorganic fibers. Glass fibers or carbon fibers are preferably used. In a preferred embodiment, the content of fibers is from of 0.1 to 15%, more preferably from 2 to 10%, by weight, based on the total weight of the formed body.

According to another preferred embodiment, the formed body contains additionally at least one carbonized resin for further stabilization of the inorganic amorphous supporting structure and for bonding and fixing the adsorption agents.

Suitable resins are phenolic resins, furan resins, epoxy resins, polyester resins, and mixtures thereof. It is preferred to use phenolic resin, particularly novolak. While heating and/or firing the formed body, the resin undergoes pyrolysis and improves the adhesion between adsorption agent and amorphous supporting structure. That is to say, the carbonized resin acts as an additional adhesive agent.

The bonding agent novolak preferably used in the present the invention is a powdery, partially crosslinked phenol formaldehyde resin having a melting point between 80° and 160° C., particularly between 100° and 140° C. In the present invention, use is preferably made of novolaks in powder form showing a high degree of crosslinking, since they wet the adsorption agents only slightly and are thermally decomposed when the green body is heated, so that the surface of the adsorption agent does not become sealed up, i.e. the adsorption characteristics are not, or only insignificantly, degraded.

According to a preferred embodiment, the adsorptive formed body of the invention has a channel structure. The channel structure can have through passages and/or blind passages, which passages can be linear and/or curved, for example in the form of a wave. The adsorptive formed body is thus preferably in the form of a formed body containing through passages. The passages are preferably linear.

The passages can have any geometrically regular and/or irregular, i.e. general, shape. A favorable shape of a passage cross-section has been found to be a geometrically regular shape, particularly a tetragonal, preferably square, hexagonal, octagonal, and/or circular shape.

By the shape of a passage cross-section is meant the shape of any one passage, the cross-section being taken normal to the passage axis. In the case of curved passages, the passage axis is not straight. The shape of the passage cross-section of a single passage is referred to below simply as the passage shape.

The inventors have found that the passage shape affects the flow resistance of the adsorptive formed body. It has also been found that a gas passing through the adsorptive formed body develops regions of varying flow velocity, depending on the passage shape.

This means that flow resistance develops depending on the shape of the passage. This flow resistance can be measured by recording the pressure of the gas before it passes into the adsorptive formed body, and as it flows out of the adsorptive formed body. The pressure drop is then a measure of the flow resistance in the adsorptive formed body.

The inside wall surfaces of the individual passages act as friction surfaces and are substantially responsible for the pressure drop. It has been found that for a given total area of the passage cross-sections, the pressure drop is dependent on the shape of the passage.

The area of the cross-section of any one passage is referred to below as passage cross-sectional area. The sum of the passage cross-sectional areas is referred to as the open area.

Moreover, the area of the inside wall surfaces is regarded as the friction area. With a circular passage shape, the friction area is smaller than that of all other passage shapes having the same passage cross-sectional area.

When a gas is passed through an adsorptive formed body having a square passage shape, there are lower flow velocities in the corner regions of the passage compared with the flow speeds in the vicinity of the passage axis. The closer the passage shape gets to a circular shape, the smaller are the regions with low flow velocities. A regular hexagonal passage shape comes quite close to a circular passage shape, and with a regular hexagonal passage shape the open area may be optimized so as to produce a large open area.

Comparative measurements have shown that an adsorptive formed body that has a regular hexagonal passage shape presents less resistance to flow than one having a square and/or tetragonal passage shape of the same passage cross-sectional area.

Thus the pressure drop in an adsorptive formed body that has passages of a hexagonal passage shape is less than that in adsorptive formed bodies having a tetragonal passage shape.

Thus in a preferred embodiment, the adsorptive formed body has a regular hexagonal passage shape, i.e. a honeycomb structure.

In another embodiment, the adsorptive formed body preferably has passages of tetragonal passage cross-section, since such an adsorptive formed body can be produced by means of extrusion in commercially available extruders.

The adsorptive formed body of the invention preferably has a cellularity of from 10 to 100, more preferably from 20 to 600, and most preferably from 50 to 400 passages per square inch, which, preferably, extend primarily along the longitudinal axis of the formed body. The formed body usually has a cylindrical shape.

Preferably, the passage walls of the adsorbent formed body have a thickness ranging from 100 μm to 1000 μm, preferably from 150 to 450 μm.

Another object of the invention is achieved by means of a process for the production of the formed body of the invention, comprising the following process steps:

mixing adsorption agent, at least one substance capable of forming an amorphous supporting structure, plasticizing agent, liquid phase and, optionally, other auxiliary materials, to produce a formable mixture, the substance capable of forming an amorphous inorganic supporting structure consisting of or comprising glass. the proportion of amorphous inorganic supporting structure being from 25 to 60% by weight, based on the total weight of the resulting formed body.

shaping the mixture produced in step (a) to produce a formed body, the formed body having a channel structure incorporating passages.

heating the formed body produced in step (b) at least to the melting temperature of the substance capable of forming an amorphous supporting structure, cooling the heated formed body produced in step (c) with the formation of an amorphous supporting structure.

Shaping of the formed body in step (b) is done preferably by means of extrusion of the starting mixture produced in step (a).

An aqueous phase or water alone is used as the liquid phase. The viscosity of the starting mixture can be adjusted by means of the quantity of water initially added. Preferably the content of liquid phase in the resultant formable mixture, more preferably the content of water in the resultant formable mixture, is not more than 55% by weight based on the total weight of the resultant formable mixture.

The plasticity of the starting mixture is adjusted by the addition of a plasticizing agent. It has been found that a plasticizing agent must be added in order to ensure formability of the mixture produced in step (a).

The substance used that is capable of forming a supporting structure is a supercooled glass melt. It is preferred to use crushed glass, more preferably glass powder, as the glass supercooled melt. The glass used preferably has a melting point of less than 1200° C., and more preferably less than 1100° C. Glass having a melting point ranging from about 900° C. to about 1000° C., has been found to be very suitable.

For example, the glass can have the composition listed in Table 1:

TABLE 1

| | |
|---|---|
| $SiO_2$ | approx. 63.0% |
| $Al_2O_3$ | approx. 3.0% |
| $Fe_2O_3$ | approx. 0.1% |
| MgO | approx. 1.2% |
| CaO | approx. 2.0% |
| $Na_2O$ | approx. 9.0% |
| BaO | approx. 10.0% |
| $SrO_2$ | approx. 6.7% |

Glass of the above composition has a softening temperature of 578° C. and a melting point of 920° C.

Apart from the adsorption agent, the substance capable of producing the amorphous supporting structure and plasticizing agent, there may be added other auxiliary materials such as fillers, fibers, lubricants, soap, green binding agents, and mixtures thereof, in step (a).

It has been found to be advantageous when fillers and/or fibers are added in addition to the plasticizing agent.

Regarding the fillers and fibers, reference is made to the above statements thereon, which are equally applicable here.

The plasticizing agent is preferably selected from the group consisting of wax, paraffin waxes, fatty acids, preferably oleic acid, and mixtures thereof.

These auxiliary materials improve the internal slip, i.e. they provide good slip of the particles relative to one another. This is particularly advantageous, since local congestion effects are avoided in the individual channels of the extruder mold during extrusion.

Similarly, soap can be added to the starting mixture in step (a), in order to improve the slip of the mixture in an extruder or its mold. A suitable soap is preferably curd soap, soft soap or a metallic soap. Preferably, sodium stearate or potassium stearate is used.

Glycerin and/or polyalkylene glycols, such as polyethylene glycol, have also proved to be very suitable as lubricant.

In a preferred embodiment, at least one carbonizable resin, preferably a phenolic resin, and more preferably a novolak, can be added as the adhesive agent in step (a) of the process of the invention. The addition of phenolic resin may be dependent on the surface properties, particularly the pH, of the surface of the adsorption agent used. In some circumstances, there may be no need to add an adhesive agent.

Another auxiliary that can be added in step (a) of the process of the invention is a green binder. This improves or strengthens the green body resulting from extrusion. Suitable green binders are liquid starch, cellulose ether or a cellulose derivative, for example, methylhydroxypropyl cellulose, and mixtures thereof.

The cellulose ether binds the water added in step (a) around the activated carbon and contributes to stabilization of the green body. Furthermore, the green binder assists homogenization of the starting mixture consisting of activated carbon and, optionally, added fillers, in that it counteracts any possible separation of the starting materials due to their different densities.

For example, methyl cellulose, ethylhydroxyethyl cellulose, hydroxybutyl cellulose, hydroxybutylmethyl cellulose, hydroxyethyl cellulose, hydroxymethyl cellulose, hydroxypropyl cellulose, methylhydroxypropyl cellulose, hydroxyethylmethyl cellulose, sodium carboxymethyl cellulose, or mixtures thereof can be used as the cellulose ether.

Preferably, the quantity of green binder added, for example cellulose ether, is not more than about 5% by weight, based on the total weight of the starting mixture. Otherwise, there is the risk of serious defects in the form of macroporosity arising during firing of the extruded activated carbon formed body, owing to burnout of the green binder.

Preferably, while adding water to adjust the viscosity of the extrudable mixture produced in step (a), up to 20% by weight of the water is mixed with some of the cellulose ether. The advantage of this is that excessive adsorption of the water in or on the activated carbon will be avoided.

Table 2 provides an overview of the preferably used components to give a mixture that can be shaped by extrusion. The ranges stated refer in each case to the preferred ranges. It is, of course, possible to use more, or less, of the individual components. The respective components for the starting mixtures always add up to 100% by weight of starting mixture. The invention is not, however, restricted to the preferred ranges stated in Table 2.

TABLE 2

| Component | Range % by weight |
|---|---|
| Adsorptive material | 10-30 |
| Glass powder | 25-45 |
| Filler | 5-15 |
| Glass fibers or carbon fibers | 2-10 |
| Cellulose ether | 1.5-3 |
| Lubricant | 0.5-2 |
| Wax | 1-4 |
| Plasticizer | 0.25-1.5 |
| Soap | 0.25-2 |
| Water | 25-40 |

In step (b), the formable mixture produced in step (a) is fed to a shaping tool, for example, an extruder, and shaped thereby. Following shaping, the formed body is preferably cut to the desired length. Between shaping in step (b) and heating in step (c), a drying step is preferably interpolated, in order to reduce the content of liquid phase in the green body, ie the unbaked formed body produced in step (b), prior to heating.

This predrying step is preferably carried out by means of convection drying, microwave drying, and/or radiation drying. Preferably, the wet green body is predried by irradiation with microwaves combined with circulation of air. In this case the temperature of the air is from approximately 20° C. to approximately 100° C., and more preferably from 30° C. to 70° C. In this manner the formed body of the invention can be dried down to a residual moisture content of <5% within a period of from 10 to 20 minutes without the formation of defects or cracks.

A great advantage of the green body manufactured by the process of the invention is that the predrying time required is unusually short. This means, of course, that the manufacturing process is greatly simplified, since the green body can be predried in less time and at lower energy consumption.

Predrying of the formed body is preferably carried out until the residual content of liquid phase in the formed body is less than approximately 10% by weight and preferably less than approximately 5% by weight, based on the total weight of the formed body.

The residual moisture can be extracted from the formed body advantageously within a period of from 40 to 90 minutes in a through circulation cabinet so that the entire drying process will take approximately from 1 to 1.5 hours of drying time.

It has been found that it is advantageous when the moisture is permanently and quickly removed, in order to avoid cracking of the extruded formed body during the drying process. The formed body is preferably dried to a water content of 2.5% by weight or less.

Drying might cause shrinkage of the formed body with respect to diameter and length. This shrinkage is governed by the respective components of the starting mixture, particularly by the content of adsorption agent. The amount of shrinkage caused during the drying step can, for example, be approximately from 2 to 10% with respect to the diameter of the formed body, and from 1 to 6% with respect to the length of the formed body.

Following the optional drying process, step (c) of the process of the invention is carried out to effect heating, preferably under inert conditions. This heating step causes, first of all, so-called dissociation, i.e., thermal decomposition of the additives used. Preferably, this process of decomposition is carried out under a blanket of protective gas, preferably under a blanket of nitrogen, to avoid oxidation of the adsorption agent.

Heating in step (c) of the process of the invention further causes fusion of the substance capable of forming the amorphous supporting structure. Preferably, in step (c), the temperature is maintained at or above the melting temperature of the substance capable of forming the amorphous supporting structure until said substance is substantially completely fused, preferably completely fused, and the adsorption agents are fixed on or in the melt. The whole is then cooled, with the result that solidification of the supercooled melt of glass leads to the formation of the amorphous supporting structure.

This heating or firing might cause shrinkage of the formed body with respect to diameter and length. The degree of this shrinkage is governed by the components used in the starting mixtures, particularly by the content of adsorption agent therein. The amount of shrinkage following heating or firing can be up to 15% with respect to the diameter of the formed body, and up to 12% with respect to the length of the formed body, including the shrinkage caused during the drying step. Preferably, the total shrinkage following heating or firing is less than 10% with respect to the diameter of the formed body, and less than 2%, with respect to the length of the formed body.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The present invention is explained in greater detail below with reference to examples and the attached figures. The examples serve exclusively to provide further elucidation and are not to be considered as a restriction. The figures are as follows:

FIG. 5 shows an SEM image (scanning electron micrograph) of the honeycomb element of Example 1a;

DETAILED DESCRIPTION OF THE INVENTION

Example 1 of the Invention (Ex. 1)

The adsorption agent used was a powdered activated carbon having an internal surface area (BET) of 1560 m$^2$/g. This activated carbon was activated with the aid of a chemical process involving phosphoric acid and had a pH of 2-3 in an aqueous extract. The filler used was clay, in order to exploit its plastic properties for adjusting the consistency of the extrudable mixture. According to the manufacturers, a temperature of at least 1000° C. is required to bake this clay. For the production of the amorphous matrix use was made of the glass given in Table 1 in the form of glass powder. The glass used had a softening point of 578° C. and a melting point of 920° C. The components were mixed with water and further auxiliaries, such as those mentioned in Table 3, in the percentages by weight stated therein.

TABLE 3

| Component | Range % w/w |
| --- | --- |
| Activated carbon | 22 |
| Filler | 10 |
| Glass powder | 29 |
| Cellulose ether | 2 |
| Lubricant | 1 |
| Wax | 3 |
| Plasticizer | 1 |
| Soap | 1 |
| Water | 31 |

The resulting extrudable mixture was extruded with the aid of a suitable extruder mold to form a cylindrical channel structure containing 200 cpsi (cells per square inch).

Drying was carried out with the aid of a microwave/circulating air dryer. Within a period of 6 minutes, 95% of the water content was extracted by drying without noticeable defects occurring in the formed body. The residual 5% of the water content was extracted in a through circulation cabinet at 90° C. over a period of one hour. During the drying operation shrinkage took place to the extent of 3.9% with respect to the diameter of the formed body and 1.5% with respect to the length of the formed body.

The fusion process was carried out in a heating ramp. To this end, the dried formed body was heated under a blanket of nitrogen at a heating rate of 5 K/min up to 950° C. and kept at this temperature for 45 minutes. Cooling was then effected at a cooling rate of 10 K/min down to room temperature. Shrinkage took place to the extent of 9.1% with respect to the diameter of the formed body and 9.1% with respect to the length of the formed body.

The finished formed body having a channel structure had a diameter of 30 mm and was ground to a length of 100 mm.

A number of tests were carried out on this completed formed body, as described below, particularly in comparison with the formed bodies which had been produced by the processes disclosed in U.S. Pat. No. 5,914,294 and DE 101 04 882.

Stability Test

The stability was determined by a simple pressure test. For this purpose, the formed body was clamped between the two rams of a tensile tester (sold by Zwick, 89079 Ulm) with microcellular rubber placed between the formed body and the rams for homogenization of the applied compressive forces. The pressure was applied in one test normal to the passages of the formed body and, in another test, parallel to an axis of the passages of the formed body. Using a force transducer, the force was determined at which the formed body broke. This value is listed in Table 4 as the bursting strength in N.

Adsorption Capacity Test

The adsorption capacity and the capability of releasing the adsorbed hydrocarbons by regeneration with air were determined using a test as defined in ASTM D 5228-92. The formed body was charged with n-butane using a concentration of 50% of n-butane in nitrogen at a volumetric flow rate of 0.1 L/min until a breakthrough of 5000 ppm had occurred. Desorption was then carried out with 22 L/min of dry air for 15 minutes. Following three adsorption/desorption cycles, a fixed working stroke was established with a residual charge in the adsorbent formed body or filtering system. The results of this test are listed in Table 4 as working capacity in g and residual charge in g.

Test on the Efficiency of the Filtering System

In order to examine the effectiveness of the filtering system for reducing residual emissions of a tank ventilating system, the filtering system was connected, as an auxiliary filter, to the rear of an activated carbon canister. The activated carbon canister had previously been charged with n-butane and desorbed over several cycles until a state of equilibrium had been reached. The canister, together with the installed filtering system, was then charged with a defined charge for the purpose of carrying out the emission test and purged once with a total of 294 L of dry air. This was followed by a 24 hour equalizing phase, during which all of the feed pipes to the canister and filtering system were closed. A fuel tank was then connected and the entire system comprising fuel tank and attached activated carbon canister and filtering system was placed in a closed climatic chamber. The output at the rear of the filter was fed to a so-called mini SHED box (SHED: Sealed Housing for Evaporative emissions Detection), in which the emissions were measured which escape from the system via the filter, the entire system being heated twice from 18° C. to 40° C. over a period of 48 hours. Readings were taken according to CFR 86 of the Environmental Protection Agency, USA and in consideration of the statements in Guideline 24, Release 9 of General Motors. For the purposes of comparison, the entire test was repeated without the use of a filter. The results are listed in Table 4 in mg of emissions measured on the 1 st day and on the 2nd day.

TABLE 4

| | U.S. Pat. No. 5,914,294 | DE 101 04 882 | Example 1 of present invention |
| --- | --- | --- | --- |
| Bursting strength (N) | 1000 | 780 | 1100 |
| Working capacity (g) | 2.0 | 1.85 | 2.1 |
| Residual charge (g) | 0.2 | 0.75 | 0.3 |
| Emission* 1st day (mg) with filter | 9.0 | 58 | 7.9 |
| Emission** 2nd day (mg) with filter | 17 | 75 | 12 |

*Emission on 1st day with no filter was 70 mg
**Emission on 2nd day with no filter was 120 mg

Results

The values in Table 4 show distinctly that the properties of the filtering system of the invention clearly represent an improvement on the filtering system described in DE 101 04 882 and are equivalent to, or a slight improvement on, the filtering system disclosed in U.S. Pat. No. 5,914,294. In view of the aforementioned process engineering advantages gained by the filtering system of the invention, the present invention represents a distinct improvement over the prior art.

Comparative Example 1a of the Invention

Using the recipe given in Table 3, further formed bodies of the invention were produced in which only the content of activated carbon was varied with appropriate changes in the water content. The content of activated carbon of example 1 was 36% by weight, and the contents of activated carbon in this comparative example were 20% by weight, 32.5% by weight, and 34% by weight. As shown in Table 5, the content of activated carbon between 20% by weight and 36% by weight has astonishingly no influence on the shrinkage of the adsorbent formed body occurring during drying and during the fusion process.

TABLE 5

| Activated carbon | Shrinkage due to drying | | Shrinkage due to fusion | |
|---|---|---|---|---|
| | Diameter | Length | Diameter | Length |
| 20% w/w | 3.8% | 2% | 9.1% | 9.2% |
| 32.5% w/w | 3.9% | 2% | 9.0% | 9.3% |
| 34% w/w | 3.8% | 2% | 9.3% | 9.1% |
| 36% w/w | 3.9% | 2% | 8.9% | 8.9% |

Comparative Example 1b of the Invention (C. Ex. 1b)

Based on the recipe given in Table 3 and the manufacturing process described with reference to Example 1 of the invention, an adsorbent formed body having a content of activated carbon of 18% by weight was produced. The activated carbon used had an internal surface area of 2000 m²/g. As in Example 1, the activated carbon was produced with the aid of an activation process involving phosphoric acid. Following the chemical activation, however, the mixture was re-treated with steam, in order to influence the pore structure. In an aqueous extract, the activated carbon had a pH of 7. The working capacity was similar to the values found in Example 1. However, total shrinkage is significantly reduced.

Example 2 of the Invention (Ex. 2)

Based on the recipe in Table 3 and the manufacturing process described with reference to Example 1, an adsorbent formed body having a content of activated carbon of 20% by weight was produced. The internal surface of the activated carbon used was 1750 m²/g. The activated carbon was produced with the aid of an activation process involving steam. Following this activation, the activated carbon had a pH of 9.5 in an aqueous extract. The carbon was then washed following activation with 5% strength hydrochloric acid and had a pH of 5.9 in use.

With the aid of formula (I) it is possible, on the basis of the internal surface area of the activated carbon used and the weight of activated carbon used, to calculate an expected theoretical reduction factor of the finished adsorptive formed body and to compare this with the shrinkage values obtained in the examples.

$$f_{Red} = 1 - A_{FK}/(\Phi_{AK} \cdot A_{Ak}) \quad (I)$$

wherein
$f_{Red}$ = reduction factor
$A_{FK}$ = internal surface area (BET) of the formed body
$\Phi_{AK}$ = content of activated carbon in the formed body
$A_{Ak}$ = internal surface area (BET) of the activated carbon The results relating to the found shrinkage values and the measured working capacities are listed in Table 6 together with the calculated reduction factors.

The values given in Table 6 clearly show that with diminishing pH there is increasing shrinkage during the heating step (c) and an increasing impairment of the activated carbon.

Figure 1:
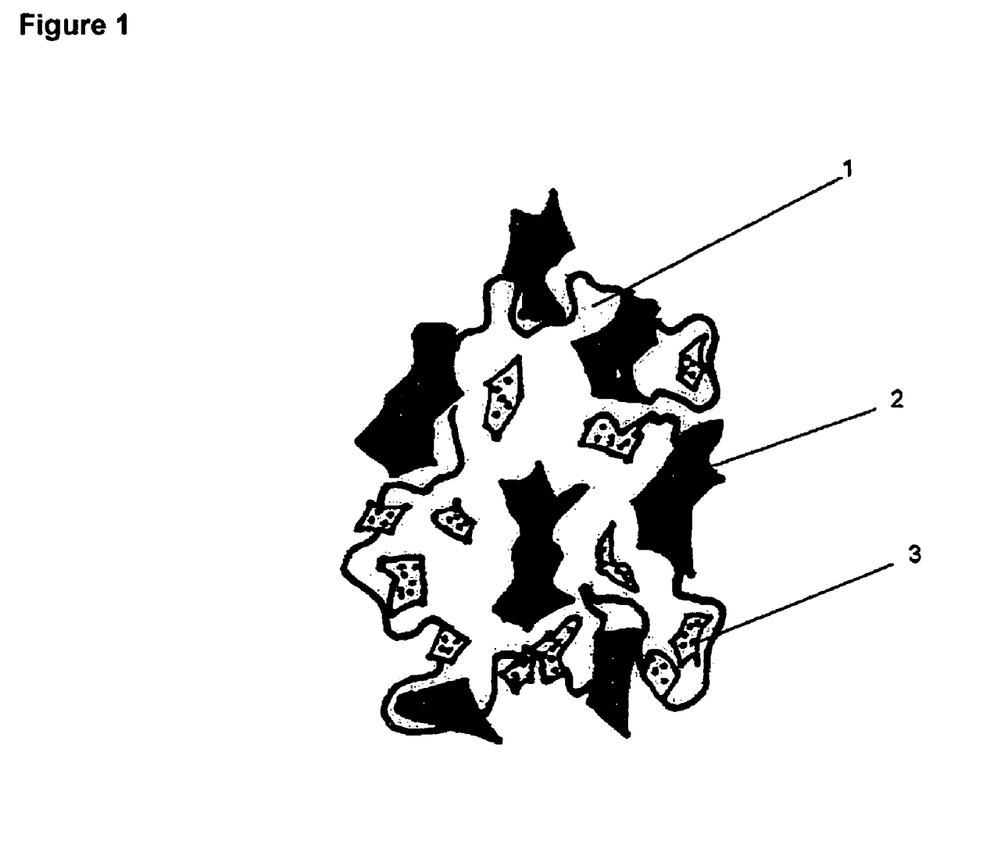
FIG. 1 shows a portion of an inorganic amorphous supporting structure (1) in which adsorption agent (2) and fillers (3) are disposed.

In the case of the adsorptive formed body of the invention of Comparative Example 1b of the invention, no shrinkage occurs during heating step (c). The amorphous supporting structure of this formed body is as illustrated in FIG. 1. The amorphous supporting structure does not bind to the activated carbon to any significant extent and closes hardly any external pores, as is apparent from the theoretical reduction factor.

In the case of the formed body of the invention of Example 1, which was produced with an activated carbon having an acidic surface, there is a very good bonding between the glass and carbon.

Example 3 of the Invention (Ex. 3)

Figure 2:
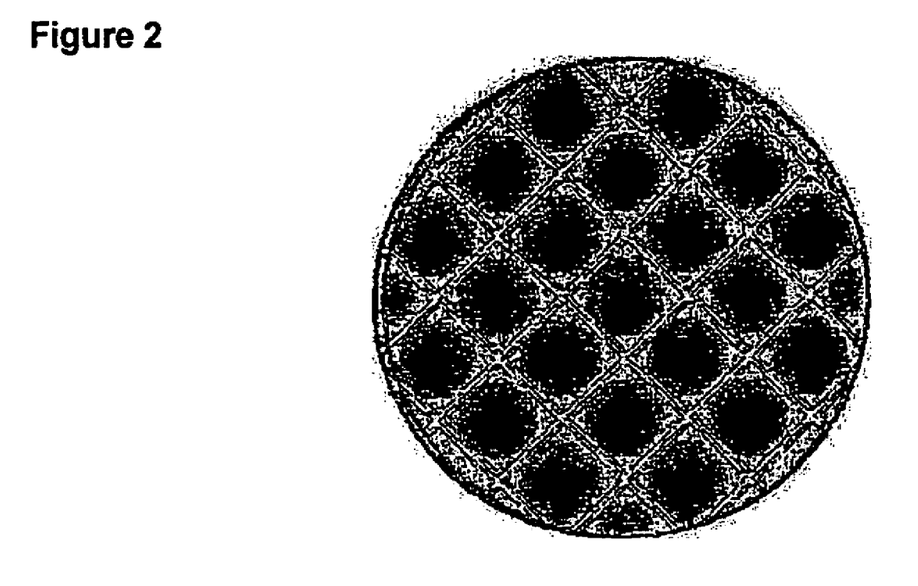
FIG. 2 shows a passage cross-section of a square passage shape according to CFD simulation computation.
Figure 3:
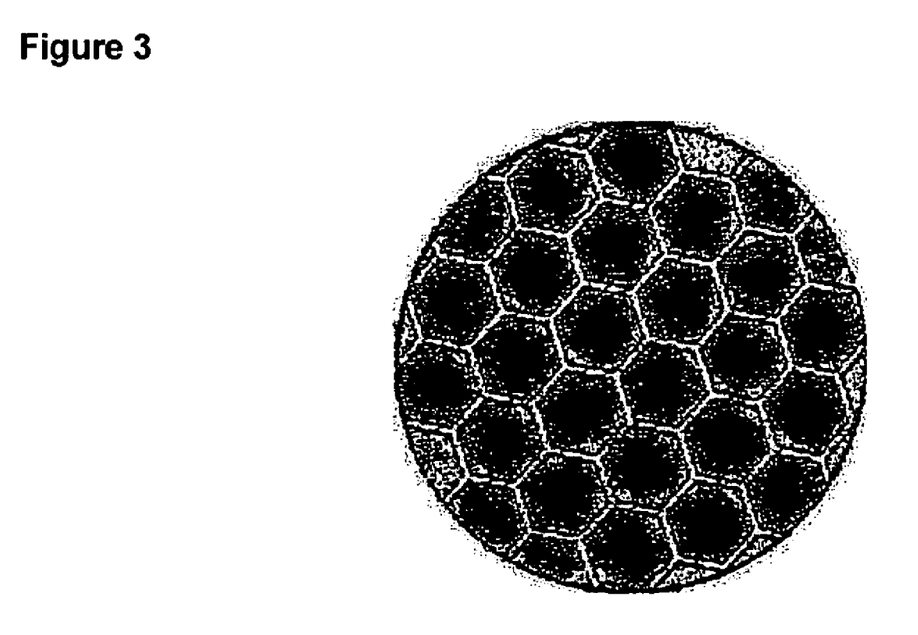
FIG. 3 shows a passage cross-section of a hexagonal passage shape according to CFD simulation computation.

Examples 1 and 2 show adsorptive formed bodies having a regular tetragonal passage shape. The following example illustrates the advantages of an adsorptive formed body having a regular hexagonal passage shape over an adsorptive formed body having a square passage shape. FIGS. 2 and 3 show the corresponding regular hexagonal and square passage shapes.

For illustration purposes, CFD (Computational Fluid Dynamics) simulation calculations were carried out with the passage shapes shown in FIGS. 2 and 3 using the program ADINA-F8.0 (cf www.adina.com). The dimensions of the theoretical adsorptive formed body forming the basis of the calculations show, as fixed quantities, an open area of 78% of the cross-sectional area of the entire adsorptive formed body and a distance of 6.52 mm between opposing passage walls in any one passage. The wall thickness was a variable quantity and was thus 0.7 mm for the regular hexagonal passage shape and 0.75 mm for the square passage shape. The gray scales illustrated in FIGS. 2 and 3 indicate the flow rate within of the passages. The grades of gray may be discerned from the accompanying scale.

From a comparison of FIG. 2 and FIG. 3 it is evident that distinctly stronger currents form near the passage axis of the square passage shape, and the cross-sectional area of each individual passage is exploited to a lesser extent than in the case of the regular hexagonal passage shape. The consequence is a more pronounced pressure drop with the square passage shape than with the regular hexagonal passage shape. The CFD simulation computations carried out on the hexagonal passage shape yield a pressure drop reduced by 20%.

The theoretical results were checked with reference to experimental findings. Three adsorptive formed bodies were measured, each of which had an open area of 78% of the cross-sectional area of the entire adsorptive formed body:

(1) an adsorptive formed body having a regular hexagonal passage shape and the same dimensions as those forming the basis of theoretical computation (line 3 in FIG. 4),

TABLE 6

| | pH | Content (% w/w) | Content of carbon in filter (g) | Reduction factor | Working capacity (g) | Shrinkage during drying | | Shrinkage during fusion | |
|---|---|---|---|---|---|---|---|---|---|
| | | | | | | Diameter | Length | Diameter | Length |
| Ex. 1 | 2 | 36 | 12.1 | 0.5 | 2.1 | 3.9% | 2% | 9.1% | 9.2% |
| C. Ex. 1b | 7 | 18 | 6.1 | 0.05 | 2.1 | 4.6% | 1.8% | 0% | <1% |
| Ex. 2 | 5.9 | 20 | 8.1 | 0.12 | 2.1 | 5.5% | 5.5% | 2.5% | 2% |

Figure 4:
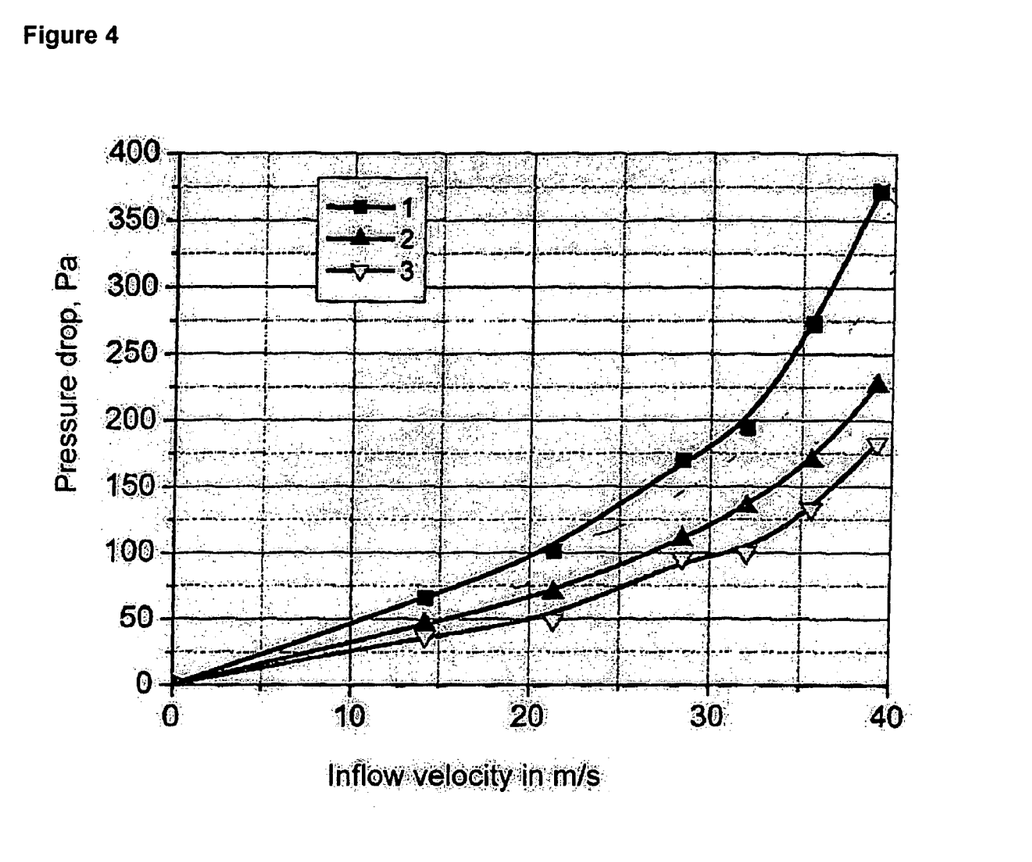
FIG. 4 shows a graph plotted in a pressure drop experiment.

(2) an adsorptive formed body having a square passage shape and the same dimensions as those forming the basis of the theoretical computation (line 2 in FIG. 4), and (3) an adsorptive formed body having a square passage shape, in which the distance between opposing passage walls in any one passage was 4.8 mm and which exhibited a wall thickness of 0.55 mm (line 1 in FIG. 4). The inner edges of the passages were additionally reinforced by spherical reinforcements having a diameter of 2 mm. By reason of the distinctly thinner wall thicknesses, this shaped activated carbon body had an open area likewise of 78% of the cross-sectional area of the entire shaped activated carbon body and possessed, therefore, a larger number of passages and, accordingly, a larger friction area than the adsorptive formed bodies (1) and (2).

FIG. 4 shows a graph in which the pressure drop is plotted in Pa against the inflow velocity in m/s for each of the three aforementioned adsorptive formed bodies. From FIG. 4 it is possible to derive the association between passage shape and/or friction area. The increase in pressure drop is caused both by the passage shape and by the friction area. From FIG. 4 it is possible to assess that the passage shape is responsible for the increase in pressure drop to an extent of 25% and the friction area to an extent of 75%.

Example 4

Structural Analyses

Additional structural analyses were carried out by means of electron microscopy (scanning electron microscopy) and wide angle X-ray scattering (WAXS) on formed bodies produced according to Examples 1a and 1b and on a formed body produced according to the prior art (U.S. Pat. No. 5,914,294).

A scanning electron microscope (SEM) is an electron microscope, in which a beam of electrons exhibiting a specific pattern is passed over an object to be magnified and interactions between the electrons and the object are implemented for the production of an image of the object.

X-ray scattering refers to the scattering of X-rays on matter. It is one of the standard methods of structure elucidation of condensed matter, particularly crystals. A special form of the X-ray scattering is WAXS (Wide Angle X-ray Scattering).

Figure 5:
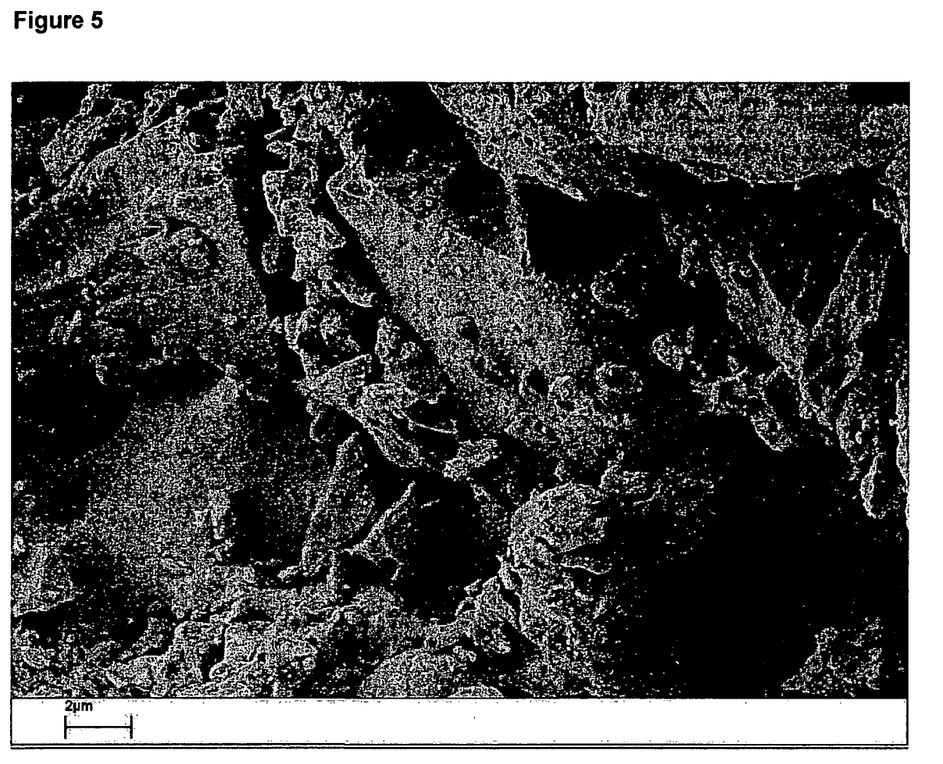

FIG. 5 shows the formed body relevant to the diagrammatic drawing in FIG. 1. The figure shows an SEM image of a honeycomb element of Example 1a. To the left and right there can be seen activated carbon particles (light gray sharp-edged grains having a size of from 10 µm-15 µm). Below the grain of activated carbon on the left-hand side it is possible to discern the smooth amorphous structure of the glass can be seen, in which the grains of activated carbon are embedded. The small grains measuring 1 µm are the clay particles used as filler.

Figure 6:
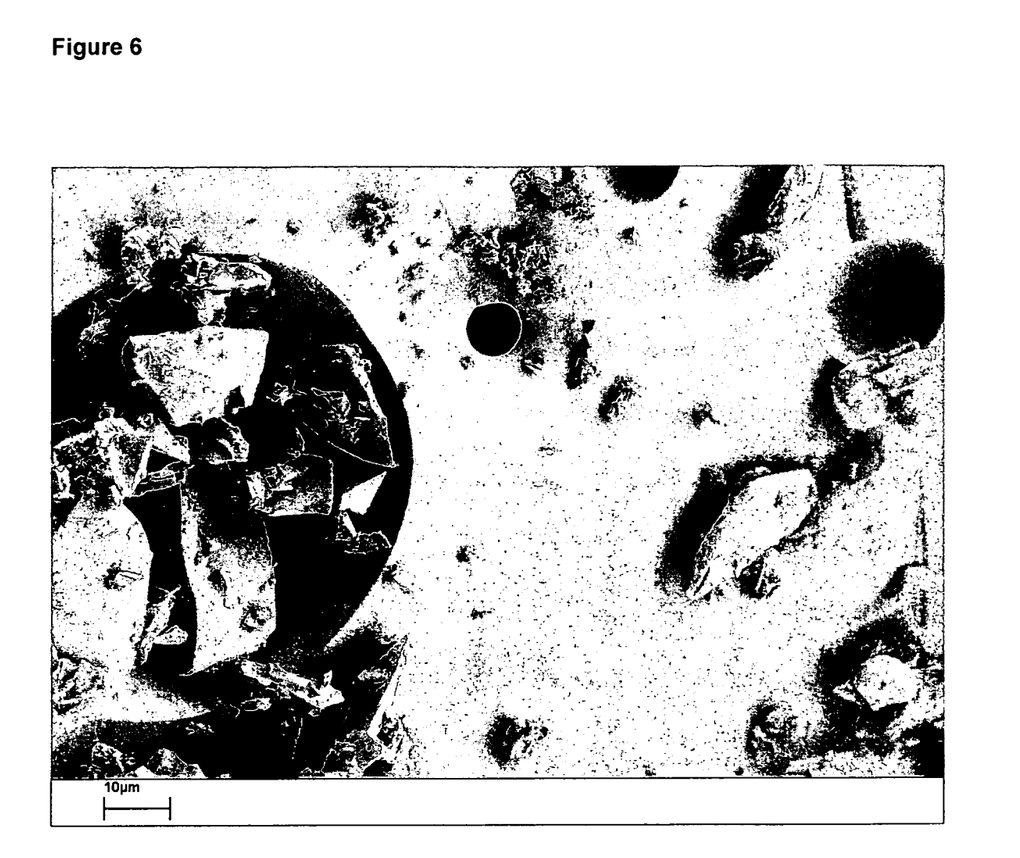
FIG. 6 shows an SEM image of pure glass following fusion and cooling.
Figure 7:
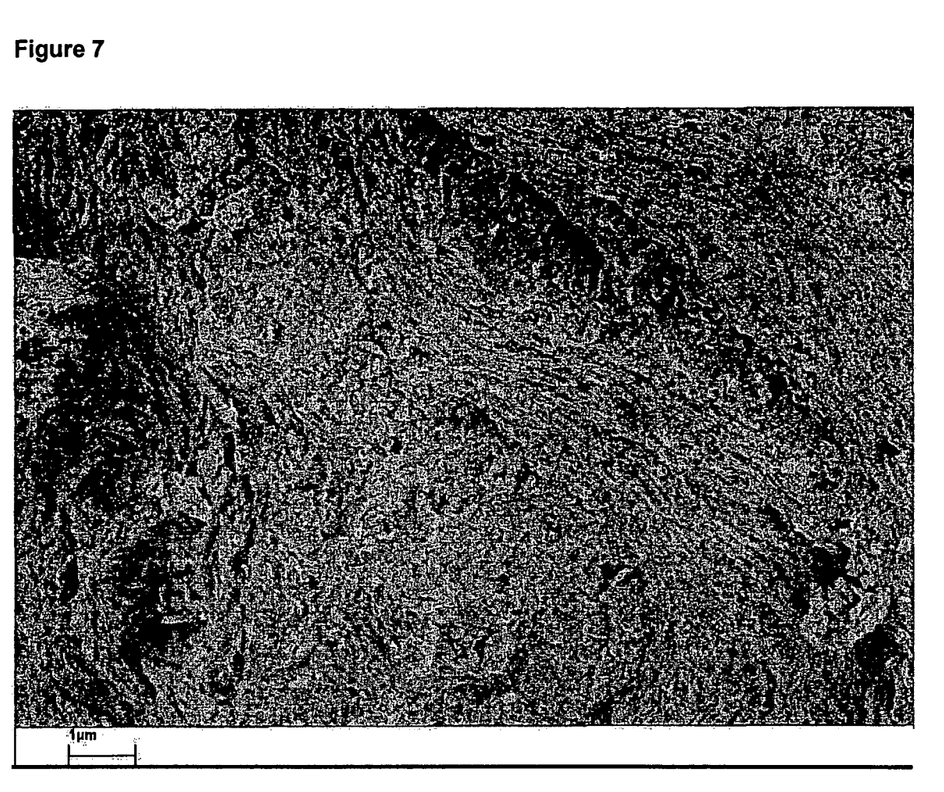
FIG. 7 shows an SEM image of a ceramic structure of clay which has been sintered at 1100° C.

The sharp difference between the polycrystalline structure of a ceramic lattice and of an amorphous matrix is clearly demonstrated by FIGS. 6 and 7. FIG. 6 shows the pure glass following fusion and cooling. FIG. 7 shows a ceramic structure of a clay that has been sintered at 1100 C. The glass shows an amorphous smooth surface, while the ceramic lattice possesses a rough surface.

In physics and mineralogy, amorphous material is a material in which the atoms form irregular patterns rather than well-ordered structures. By contrast, regularly structured materials are called crystals. A polycrystal is a crystal, whose crystal structure is irregular. The crystal comprises many small single crystals (crystallites), which are separated by grain boundaries. Most crystals in nature are polycrystalline, although there do exist monocrystalline crystals. For example, diamonds have an almost perfect monocrystalline form.

Another proof of the structural difference is provided by analysis involving wide angle X-ray scattering. Analyses of this kind were carried out by taking a honeycomb element of the prior art having a ceramic supporting structure and a honeycomb element of each of the Examples 1a and 1b and heating the same to 700° C. under standard atmospheric pressure. The activated carbon present was burnt out to leave only the pure supporting structures. The honeycomb elements of the prior art were produced in the manner proposed in U.S. Pat. No. 5,914,294 and exhibit a ceramic structure.

Figure 8:
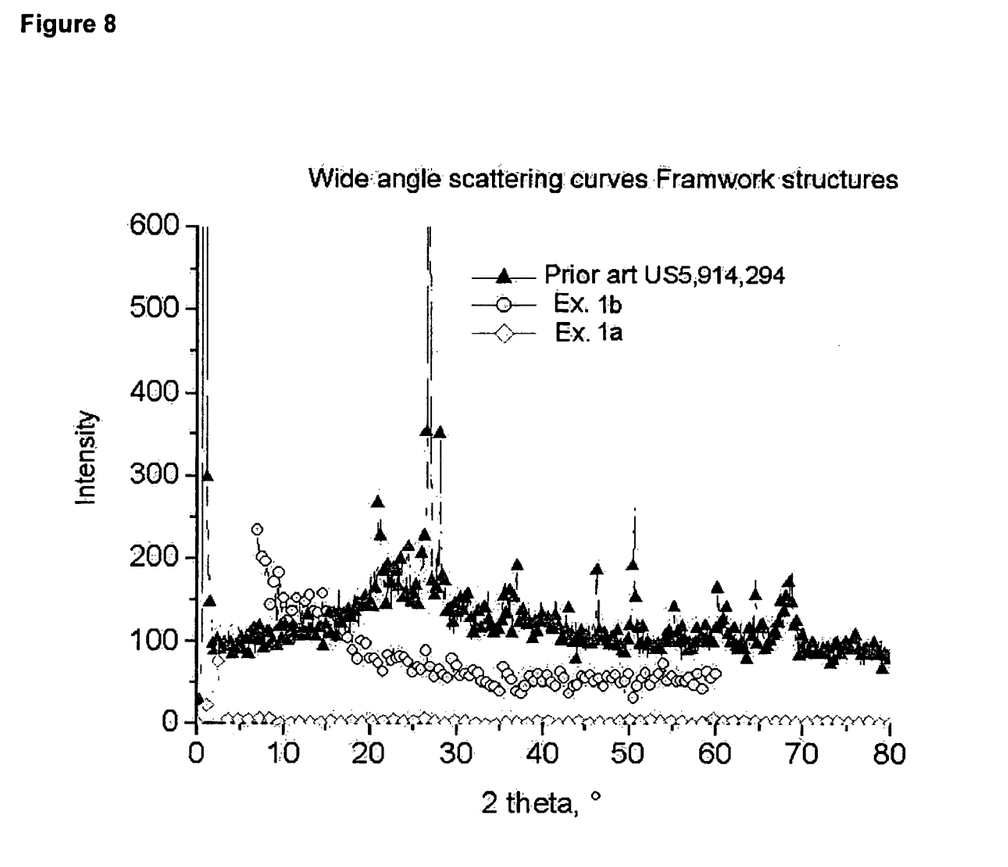
FIG. 8 shows the WAXS (Wide Angle X-ray Scattering) of the glass framework structures of Examples 1a and 1b (Ex. 1a and Ex. 1b) compared with a ceramic skeletal structure which had been produced in the manner proposed in U.S. Pat. No. 5,914,294.

In FIG. 8, the WAXS curves of all three supporting structures are illustrated. It is clearly shown that with the Examples 1a and 1b, except for an amorphous background, no scattering peaks are visible, i.e., absolutely no crystalline centers are present in the structure. The scattering curve of the sample produced according to U.S. Pat. No. 5,914,294 shows, on the other hand, very many peaks, which implies a very high degree of crystallinity.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A formed body comprising:
   an amorphous inorganic supporting structure, at least one filler, and adsorption agent, wherein the adsorption agent is disposed on and/or in said amorphous inorganic supporting structure,
   wherein the amorphous inorganic supporting structure consists of glass and the proportion of amorphous inorganic supporting structure being from 25 to 60% by weight, based on the total weight of the formed body, and
   the formed body has a channel structure incorporating passages,
   wherein said inorganic amorphous supporting structure is a three-dimensional, pore free continuous glass framework structure, and
   wherein the content of said filler is from 5 to 18% by weight, based on the total weight of the formed body, and
   the filler comprises a mineral filler selected from the group consisting of clay, aluminas, chamotte, kaolin, calcined kaolin, quartz powder, aluminum oxide, and highly plastic clay, and mixtures thereof, and
   wherein the content of adsorption agent is from 5 to 50% by weight, based on the total weight of the formed body.

2. The formed body as defined in claim 1, wherein the content of adsorption agent is from 10 to 40% by weight, based on the total weight of the formed body.

3. The formed body as defined in claim 2, wherein the content of adsorption agent is from 20 to 36% by weight, based on the total weight of the formed body.

4. The formed body as defined in claim 1, wherein the content of amorphous supporting structure is from 30 to 55% by weight, based on the total weight of the formed body.

5. The formed body as defined in claim 4, wherein the content of amorphous supporting structure is from 40 to 50% by weight, based on the total weight of the formed body.

6. The formed body as defined in claim 1, wherein the adsorption agent is in particulate form.

7. The formed body as defined in claim 6, wherein said filler comprises fibers, preferably inorganic fibers.

8. The formed body as defined in claim 7, wherein said fibers are inorganic fibers.

9. The formed body as defined in claim 7, wherein the content of said fibers is from 0.1 to 15% by weight, based on the total weight of the formed body.

10. The formed body as defined in claim 9, wherein the content of said fibers is from 2 to 10% by weight, based on the total weight of the formed body.

11. The formed body as defined in claim 7, wherein said fibers are glass fibers and/or carbon fibers.

12. The formed body as defined in claim 1, wherein said adsorption agent is activated carbon.

13. The formed body as defined in claim 12, wherein said activated carbon is produced from a group consisting of charcoal, coconut carbon, olive seed carbon, mineral coal, lignitic coke, and polymeric material.

14. The formed body as defined in claim 13, wherein said polymeric material is styrene/divinylbenzene copolymer.

15. The formed body as defined in claim 12, wherein said activated carbon is acid activated and/or steam activated.

16. The formed body as defined in claim 15, wherein the highly plastic clay is ball clay.

17. The formed body as defined in claim 1, wherein said formed body additionally contains at least one carbonized resin.

18. The formed body as defined in claim 17, wherein said at least one carbonized resin is a carbonized phenolic resin.

19. The formed body as defined in claim 1, wherein the passages of the channel structure are through passages.

20. The formed body as defined in claim 19, wherein the formed body has a cell content of from 10 to 1000 passages per square inch, which passages extend substantially in the direction of the longitudinal axis of the formed body.

21. The formed body as defined in claim 19, wherein the passages have a tetragonal passage cross-section.

22. The formed body as defined in claim 19, wherein the passages have a hexagonal passage cross-section.

* * * * *